United States Patent
Sheridan (10) Patent No.: US 10,612,436 B2
(45) Date of Patent: Apr. 7, 2020

(54) DEOILER FOR A GAS TURBINE ENGINE

(71) Applicant: United Technologies Corporation, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 120 days.

(21) Appl. No.: 15/715,998

(22) Filed: Sep. 26, 2017

(65) Prior Publication Data
US 2019/0093527 A1    Mar. 28, 2019

(51) Int. Cl.
| | | |
|---|---|---|
| *B01D 45/12* | (2006.01) | |
| *F01M 13/04* | (2006.01) | |
| *B01D 45/14* | (2006.01) | |
| *F01D 25/18* | (2006.01) | |
| *F01M 11/03* | (2006.01) | |
| *F02C 7/06* | (2006.01) | |

(52) U.S. Cl.
CPC ............. *F01M 13/04* (2013.01); *B01D 45/14* (2013.01); *F01D 25/18* (2013.01); *F01M 11/03* (2013.01); *F02C 7/06* (2013.01); *F01M 2011/038* (2013.01); *F01M 2013/0422* (2013.01); *F05D 2260/609* (2013.01); *F16N 2210/02* (2013.01); *Y02T 50/671* (2013.01)

(58) Field of Classification Search
CPC ................... F01M 13/04; F01M 11/03; F01M 2013/0422; F01M 2011/038; F01D 25/18; B01D 45/14; B01D 45/12; F02C 7/06; F05D 2260/609; Y02T 50/671
See application file for complete search history.

(56) References Cited

U.S. PATENT DOCUMENTS

| | | | | |
|---|---|---|---|---|
| 1,675,200 A | * | 6/1928 | Smith ....................... | F04D 7/04 209/274 |
| 2,289,474 A | * | 7/1942 | Anderson ................. | A47L 7/00 415/121.2 |
| 2,327,886 A | * | 8/1943 | Haber ...................... | F22B 37/26 55/338 |
| 2,790,508 A | * | 4/1957 | Allander ................ | B01D 45/14 55/345 |
| 3,031,825 A | * | 5/1962 | Fourniere .............. | B01D 45/12 126/299 E |
| 3,166,394 A | * | 1/1965 | Lockwood ............. | B01D 45/14 210/512.1 |
| 3,274,757 A | * | 9/1966 | Wapler ................... | B01D 45/14 415/108 |
| 3,415,383 A | | 12/1968 | Earle, Jr. | |

(Continued)

FOREIGN PATENT DOCUMENTS

| | | |
|---|---|---|
| JP | 2014128794 | 7/2014 |
| WO | 2005049176 A1 | 6/2005 |

OTHER PUBLICATIONS

EP search report for EP18196979.1 dated Feb. 12, 2019.

*Primary Examiner* — Dung H Bui
(74) *Attorney, Agent, or Firm* — Getz Balich LLC (57) ABSTRACT

Aspects of the disclosure are directed to a deoiler. The deoiler includes an impeller, a housing arranged as a volute scroll, a splitter wall located at an exit of the deoiler that separates a lubricant and air discharged by the deoiler, and a port located at the exit that discharges the lubricant to at least one of a pump, a tank, or a gearbox.

13 Claims, 6 Drawing Sheets

(56) References Cited

U.S. PATENT DOCUMENTS

| | | | | |
|---|---|---|---|---|
| 3,450,333 A * | 6/1969 | Saueressig | B23Q 11/0042 | 415/121.2 |
| 3,918,885 A * | 11/1975 | Palm | F23D 11/001 | 239/402 |
| 4,047,912 A * | 9/1977 | Markland | B01D 45/12 | 123/559.1 |
| 4,157,249 A * | 6/1979 | Namy | B01D 45/14 | 96/282 |
| 4,246,013 A * | 1/1981 | Truhan | B01D 45/12 | 209/717 |
| 4,312,650 A * | 1/1982 | Seki | B01D 45/12 | 209/723 |
| 4,557,241 A * | 12/1985 | Kawachi | F02M 69/08 | 123/472 |
| 4,588,351 A * | 5/1986 | Miller | B60H 1/00471 | 415/121.2 |
| 4,798,516 A * | 1/1989 | Jagst | D01G 23/08 | 209/321 |
| 4,840,645 A * | 6/1989 | Woodworth | B01D 45/14 | 55/401 |
| 7,070,637 B1 * | 7/2006 | Zhang | B01D 45/12 | 55/347 |
| 9,028,576 B2 | 5/2015 | Slayter et al. | | |
| 2007/0249479 A1 | 10/2007 | Eliasson et al. | | |
| 2010/0011723 A1 * | 1/2010 | Szepessy | B01D 45/14 | 55/438 |
| 2011/0139004 A1 * | 6/2011 | Jacobsen | B01D 45/12 | 95/216 |
| 2013/0056407 A1 * | 3/2013 | Parikh | F01M 13/04 | 210/360.1 |
| 2013/0112029 A1 * | 5/2013 | Slayter | F01D 25/18 | 74/467 |
| 2014/0250625 A1 * | 9/2014 | Huang | B01D 45/00 | 15/353 |
| 2016/0017812 A1 | 1/2016 | Sheridan | | |
| 2016/0158679 A1 | 6/2016 | Beier et al. | | |
| 2016/0206985 A1 * | 7/2016 | Garrett | B01D 45/14 | |
| 2016/0376922 A1 | 12/2016 | Belfield | | |
| 2017/0348705 A1 | 12/2017 | Pogen | | |
| 2018/0169668 A1 | 6/2018 | Eliasson et al. | | |
| 2018/0243677 A1 | 8/2018 | Schwandt et al. | | |

* cited by examiner

DEOILER FOR A GAS TURBINE ENGINE

BACKGROUND

Engines, such as those which power aircraft and industrial equipment, may employ a compressor to compress air that is drawn into the engine and a turbine to capture energy associated with the combustion of a fuel-air mixture. The captured energy causes a rotor of the turbine to rotate, which in turn causes a rotor of the compressor to rotate based on one or more shafts that connect the turbine and the compressor. The shaft(s) are supported by bearings that are contained within a bearing compartment. A lubrication system supplies lubricant to the bearings in order to clean, cool, and lubricate the bearings.

Figure 1:
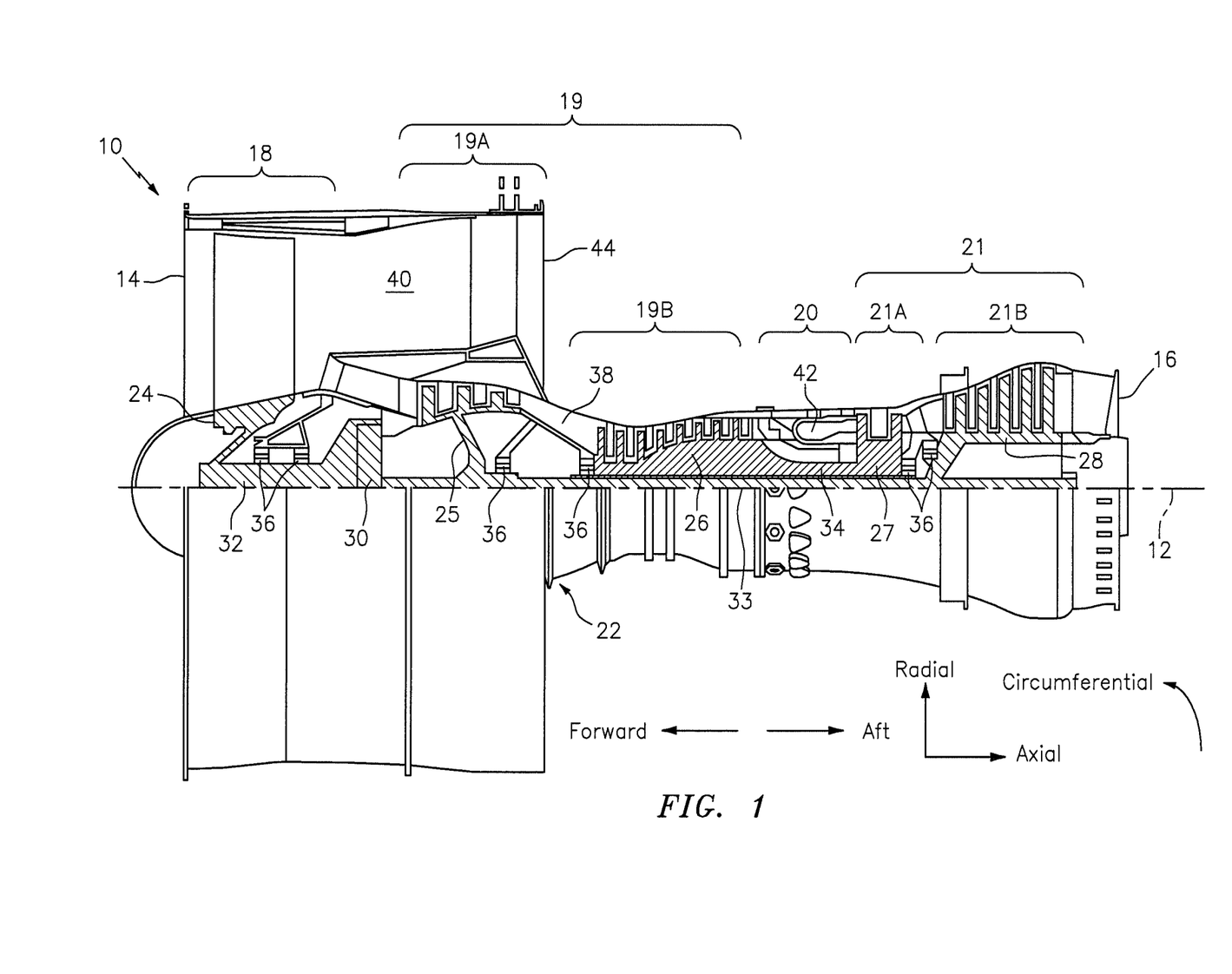
FIG. 1 is a side cutaway illustration of a gas turbine engine.
Figure 1A:
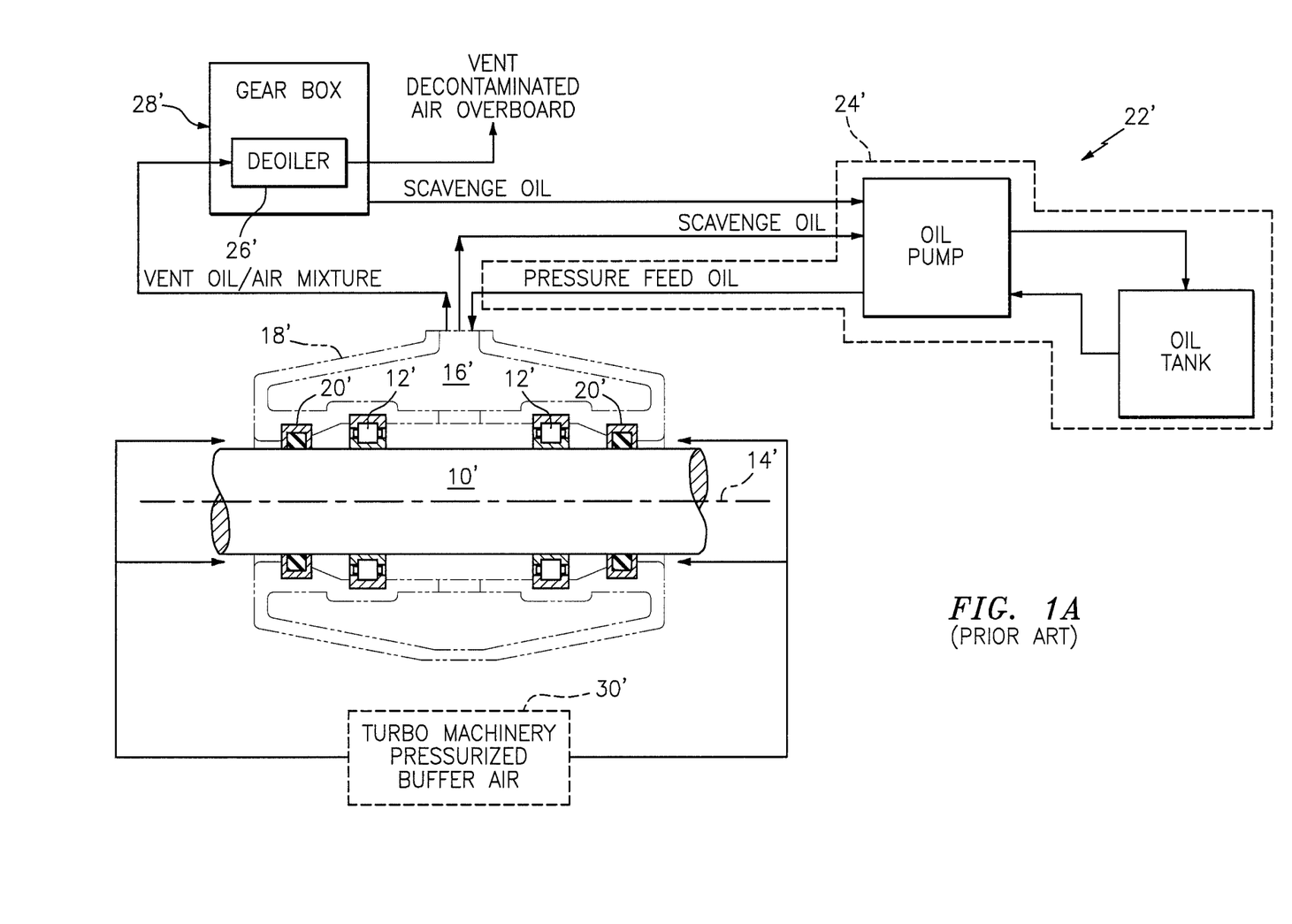
FIG. 1A is a schematic illustration showing a bearing compartment and components of a lubrication system, including a deoiler, in accordance with the prior art.

As an example of the foregoing, and referring to FIG. 1A, a turbine engine shaft 10' is shown that is supported from a non-rotatable structure of the engine by bearings 12' so that the shaft 10' is rotatable about a centerline axis 14'. The bearings 12' are enclosed in a bearing compartment 16' bounded by a compartment housing 18' and by the shaft 10'. Seals 20' segregate the compartment from its immediate surroundings. These seals 20' are imperfect; i.e., the seals 20' allow some leakage despite being designed and manufactured according to exacting standards.

A lubrication system 22' includes a lubricant supply subsystem 24'. The lubricant supply subsystem 24' includes a pump, an oil tank, supply lines, and other components not illustrated. The supply subsystem 24' introduces oil into the bearing compartment 16'. The lubrication system 22' includes a deoiler 26', which is typically enclosed inside an engine gearbox 28'. The lubrication system 22' includes a buffering subsystem 30', which extracts pressurized air, referred to as buffer air, from a working medium flowpath of the engine and delivers it to the vicinity of the seals 20' outside the bearing compartment 16'. The pressure of the buffer air exceeds the prevailing pressure inside the bearing compartment 16', thus establishing a positive pressure difference across the seals 20'.

During engine operation, the oil cools and lubricates the bearings 12'. The positive pressure difference across the seals 20' causes buffer air to flow past the seals 20' and into the compartment 16' to help prevent oil from leaking past the seals 20' in the opposite direction. The air and oil cross-contaminate each other in the compartment 16'. The oil-contaminated air, referred to as breather air, flows out of the compartment 16' to the deoiler 26' and is replenished by fresh buffer air flowing past the compartment seals 20'. The deoiler 26' separates the oil from the air, vents the decontaminated air overboard, and discharges the separated oil to the oil pump.

Conventionally, the deoiler 26' includes a large number of components to facilitate the functionality of the deoiler 26' over the operating profile of an engine—see, for example, U.S. Pat. No. 7,377,110 for a description/illustration of a deoiler. The contents of U.S. Pat. No. 7,377,110 are incorporated herein by reference. A reduction in the number of components used in a deoiler would: (1) increase the reliability of the deoiler, (2) decrease the cost of the deoiler, and (3) reduce the weight of the deoiler.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a deoiler comprising: an impeller, a housing arranged as a volute scroll, a splitter wall located at an exit of the deoiler that separates a lubricant and air discharged by the deoiler, and a port located at the exit that discharges the lubricant to at least one of a pump, a tank, or a gearbox. In some embodiments, the lubricant includes oil. In some embodiments, the deoiler is defined by at least a first radius, a second radius, a third radius, and a fourth radius, where the first radius is a radius of the impeller and originates at a first point of the impeller corresponding to a center of the impeller, where a magnitude of the second radius is equal to a value that is within a range of 95% to 105% of a magnitude of the first radius, where the second radius originates at a second point that is laterally offset from the first point in a first direction by an amount equal to a value that is within a range of 8% to 12% of the magnitude of the first radius, and where the second radius extends to the housing, where a magnitude of the third radius is equal to a value that is within a range of 115% to 125% of the magnitude of the second radius, where the third radius originates at a third point that is laterally offset from the first point in a second direction by an amount equal to a value that is within a range of 8% to 12% of the magnitude of the first radius, where the third radius extends to the housing, and where the second direction is opposite the first direction, where a magnitude of the fourth radius is equal to a value that is within a range of 135% to 145% of the magnitude of the second radius, where the fourth radius originates at the second point, and where the fourth radius extends to the housing, and where the second radius, the third radius, and the fourth radius are tangent to one another. In some embodiments, the deoiler is defined by a fifth radius that originates at the first point and extends to a starting point of the volute scroll, and where the splitter wall is located downstream of the starting point of the volute scroll. In some embodiments, the volute scroll is tapered to cause the lubricant to be substantially centered within a fluid channel. In some embodiments, the deoiler further comprises a second port located at the exit that discharges the air. In some embodiments, the deoiler further comprises a second port that receives the lubricant and air as a mixture. In some embodiments, the impeller includes a rotatable wheel and a plurality of vanes that project from the wheel.

Aspects of the disclosure are directed to a gas turbine engine comprising: a shaft, a bearing compartment that includes a bearing that supports the shaft, a gearbox that is driven by the shaft, a deoiler that is driven by the gearbox, and a lubrication system that includes a pump and a tank, where the deoiler includes a first port that receives a mixture of lubricant and air from the bearing compartment, an impeller, a housing arranged as a volute scroll, a splitter wall located at an exit of the deoiler that separates the lubricant and air discharged by the deoiler, a second port that discharges the lubricant to at least one of the pump, the tank, or the gearbox, and a third port that discharges the air from the deoiler. In some embodiments, the third port discharges the air to an overboard location that is external to the engine. In some embodiments, the gas turbine engine further comprises a duct that conveys the mixture of lubricant and air from the bearing compartment to the first port. In some embodiments, the bearing compartment includes at least one seal. In some embodiments, during an idle operating condition of the engine the deoiler pumps at least two times more air than is leaked into the bearing compartment via the at least one seal. In some embodiments, during the idle operating condition of the engine the deoiler pumps at least five times more air than is leaked into the bearing compartment via the at least one seal. In some embodiments, during the idle operating condition of the engine the deoiler pumps at least ten times more air than is leaked into the bearing compartment via the at least one seal. In some embodiments, the engine is included on an aircraft, and where during a take-off operating condition the deoiler pumps less air than is leaked into the bearing compartment via the at least one seal. In some embodiments, the impeller includes a wheel and a plurality of vanes that project from the wheel, and where a rotation of the wheel causes the mixture of lubricant and air to separate in the deoiler.

BRIEF DESCRIPTION OF THE DRAWINGS

The present disclosure is illustrated by way of example and not limited in the accompanying figures. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Various aspects of the disclosure are directed to a deoiler. The deoiler may be included as part of a lubrication system of an engine. The deoiler may include an impeller and a housing. The housing may be arranged as/include a volute scroll housing. The deoiler may separate lubricant (e.g., oil) from air. The separated lubricant may be returned to a lubricant reserve/tank. The separated air may be vented to another location, such as for example an overboard location that is external to the engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
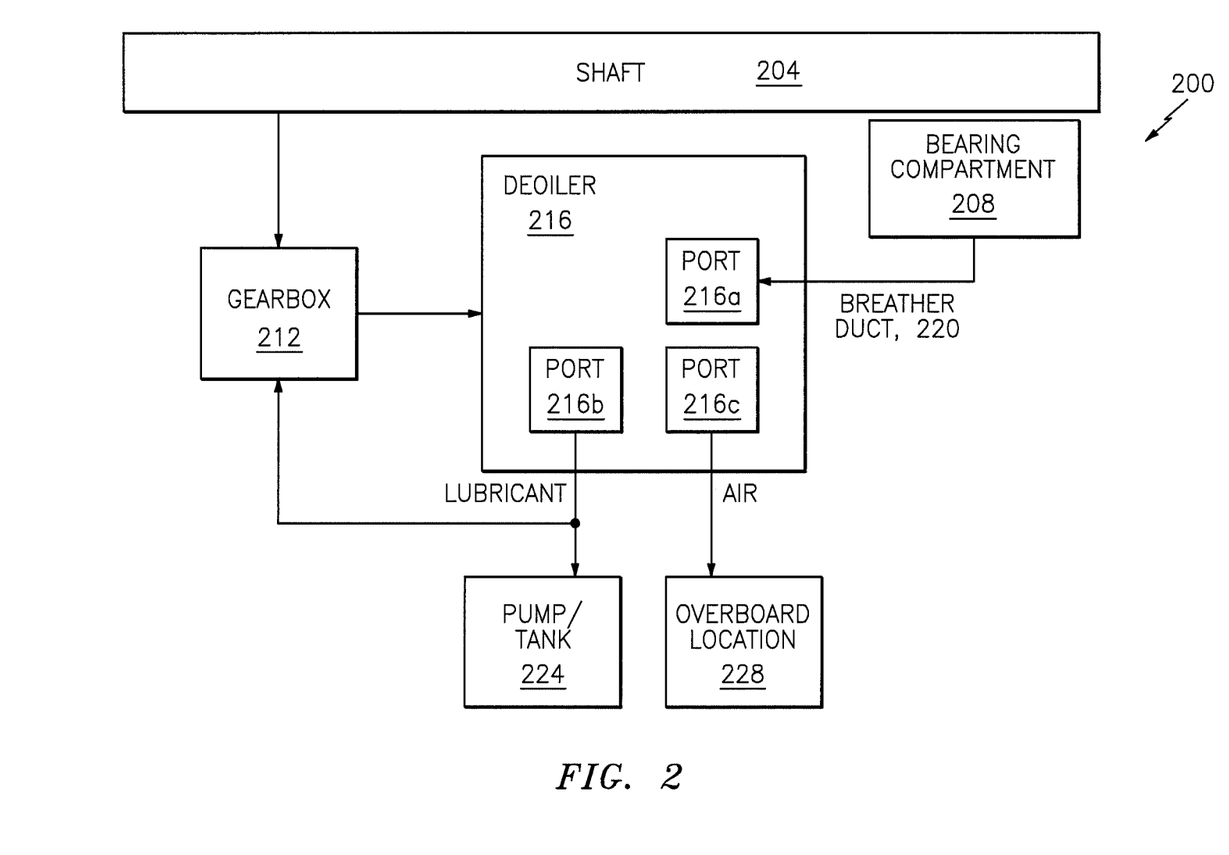
FIG. 2 illustrates a system of an engine including a deoiler in accordance with aspects of this disclosure.

FIG. 2 illustrates a system 200 of an engine (e.g., the engine 10 of FIG. 1). The system 200 may include a shaft 204 (which may, for example, correspond to one of the shafts 32-34 of FIG. 1 and/or the shaft 10' of FIG. 1A), a bearing compartment 208 (which may, for example, include/house the bearings 36 of FIG. 1 and/or correspond to the bearing compartment 16' of FIG. 1A), a gearbox 212 (which may, for example, correspond to the gearbox 28' of FIG. 1A), a deoiler 216, a breather duct/channel 220, and a pump/tank 224 (which may, for example, correspond to the pump and/or the tank of the lubrication system 22'/supply subsystem 24' of FIG. 1A).

In some embodiments, the deoiler 216 may have a form-factor/dimension that is comparable (e.g., equivalent) to the deoiler 26' of FIG. 1A; this may allow the deoiler 216 to serve as a drop-in replacement for the deoiler 26'. In this manner, legacy/existing hardware may be upgraded/updated to incorporate a deoiler of this disclosure. Stated slightly differently, legacy hardware may be retrofitted by including a deoiler of this disclosure.

In operation, the shaft 204 (or a rotor coupled thereto) may drive the gearbox 212. An output of the gearbox 212 may be provided to the deoiler 216 to drive (e.g., rotate) the deoiler 216. The bearing compartment 208 may be coupled to the deoiler 216 via the breather duct 220. The breather duct 220 may supply a mixture of lubricant and air from the bearing compartment 208 to the deoiler 216; this mixture may be received by a port 216a of the deoiler 216. The drive imparted by the gearbox 212 to the deoiler 216 may cause the mixture of lubricant and air to substantially separate in the deoiler 216. The substantially separated lubricant may be provided from a port 216b of the deoiler 216 to the pump/tank 224 and/or the gearbox 212. The substantially separated air may be provided from a port 216c of the deoiler 216 to an overboard location 228, e.g., a location external to the engine.

Figure 2A:
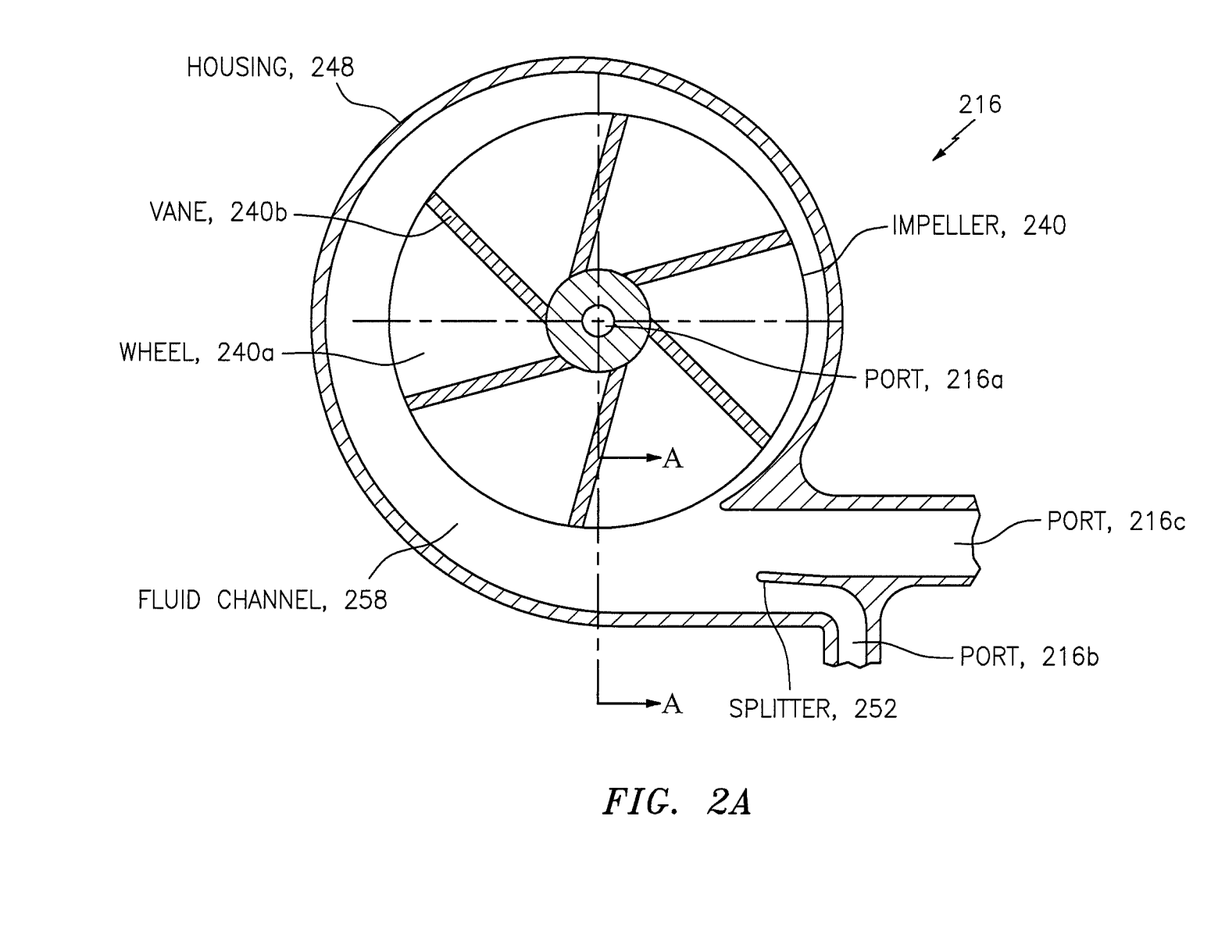
FIG. 2A illustrates components of the deoiler of FIG. 2.

Referring to FIG. 2A, the deoiler 216 is shown in greater detail. The deoiler 216 may include an impeller 240 and a housing 248. The impeller 240 may include a rotatable wheel/backing plate 240a and one or more vanes (e.g., vane 240b) that may project from the wheel 240a. The impeller 240 may be driven (e.g., rotate) based on the output of the gearbox 212 (see FIG. 2). The housing 248 may be arranged as a volute (scroll) as shown in FIG. 2A.

In operation, as the mixture of lubricant and air (which enters the deoiler 216 via the port 216a) are centrifuged by the impeller 240, the lubricant and air may tend to separate. Assuming that the lubricant is heavier/denser than the air, the lubricant may tend to be expelled towards the outer edges/surfaces of the housing 248, whereas the air may be located radially inward/inboard towards the center of the deoiler 216 (e.g., closer to the port 216a in FIG. 2A).

Figure 2B:
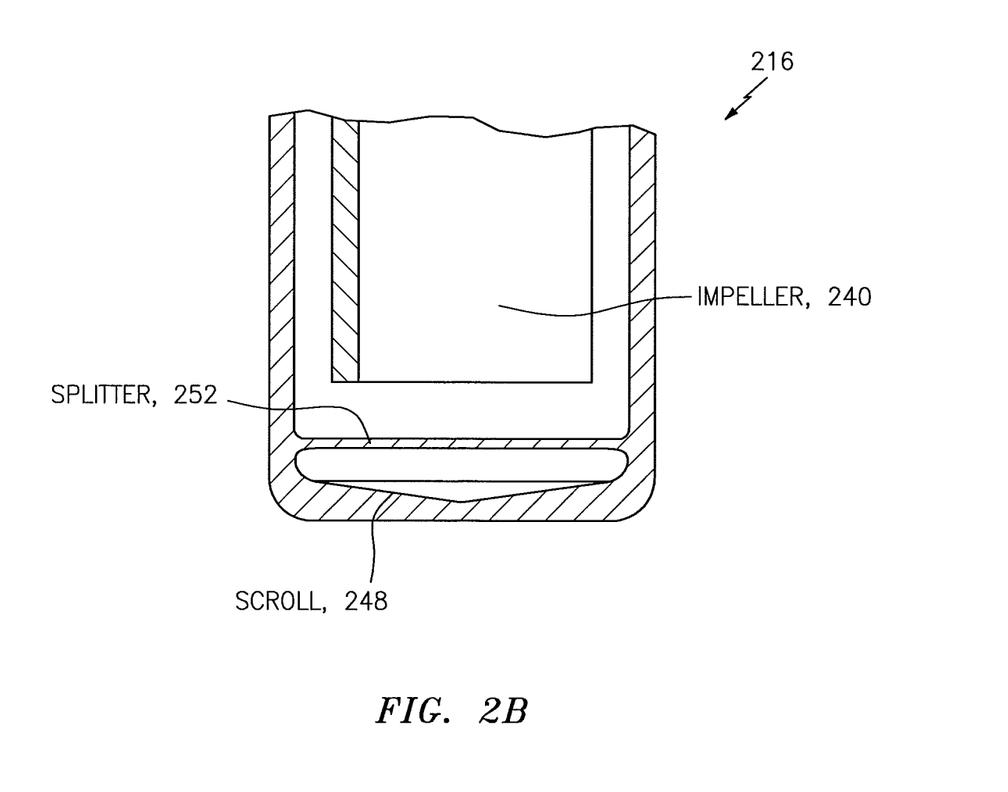
FIG. 2B illustrates a cross-sectional view of the deoiler of FIG. 2A taken about the line A-A in FIG. 2A.

A splitter wall 252, which may form a part of the housing 248, may be located at an exit of the deoiler 216 proximate the ports 216b and 216c and may maintain separation between lubricant and air. In order to discourage the lubricant from adhering to the walls of the housing 248 (e.g., in order to substantially center the lubricant within a fluid channel 258), the housing 248 may include a tapered profile. For example, and referring to FIG. 2B, the housing/scroll 248 is shown with a tapered/V-shaped profile.

Figure 2C:
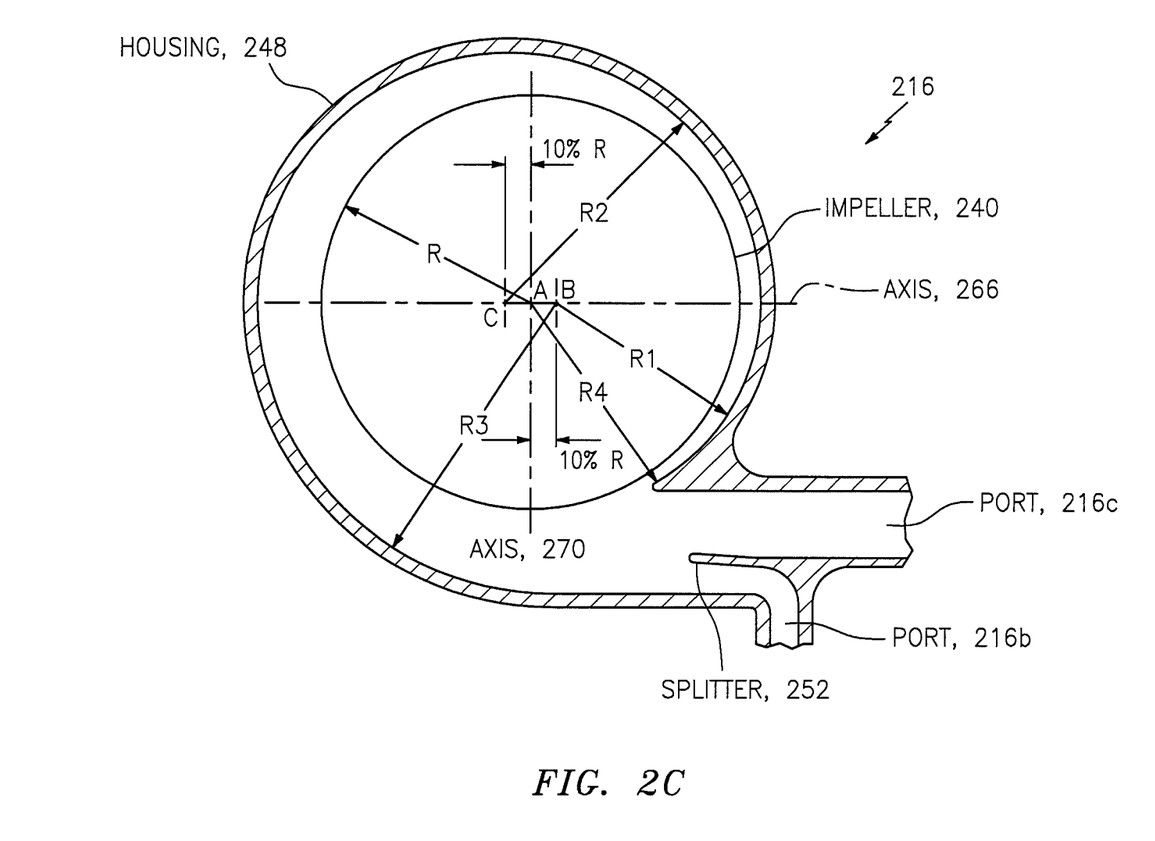
FIG. 2C illustrates a profile of a deoiler in accordance with aspects of this disclosure.

Referring to FIG. 2C, a (geometrical) profile of a deoiler (e.g., the deoiler 216) is shown in terms of a number of parameters. The profile is referenced relative to a first axis 266 and a second axis 270, where the first axis 266 and the second axis 270 are oriented perpendicular to one another. Also shown are reference points/locations A, B, and C on the first axis 266. Various radii (e.g., R, R1, R2, R3, R4) are shown in FIG. 2C. The profile and the parameters are described in further detail below.

The point A may correspond to a center of rotation of the impeller 240. The point A may be located at the intersection of the first axis 266 and the second axis 270.

The radius R may correspond to the radius of the impeller 240 (measured relative to the point A).

The point B may correspond to a location on the first axis 266 that is displaced from the point A. For example, the point B may be displaced from the point A in an amount equal to 10% of the (magnitude of the) radius R in a first direction (e.g., to the right in FIG. 2C). Although a 10% displacement is preferred, B may be displaced from A in an amount equal to 8%-12% of (the magnitude of) R.

The point C may correspond to a location on the first axis 266 that is displaced from the point A, for example, in an amount equal to 10% of the (magnitude of the) radius R in a second direction (e.g., to the left in FIG. 2C). Although a 10% displacement is preferred, C may be displaced from A in an amount equal to 8%-12% of (the magnitude of) R. The second direction may be opposite the first direction (e.g., the first and second directions may be separated by one-hundred eighty degrees relative to one another).

The (magnitude of the) radius R1 may, for example, be equal to the (magnitude of the) radius R. Although it is preferred for (the magnitude of) R1 to equal (the magnitude of) R, R1 may vary within a range of 95%-105% of R. The radius R1 may be centered/originate at the point B and may extend to the housing 248.

The (magnitude of the) radius R2 may be greater than the (magnitude of the) radius R1. For example, the magnitude of the radius R2 may be 20% greater than the magnitude of the radius R1. Although it is preferred that R2 is 20% greater than R1, R2 may vary within a range of 115%-125% of R1. The radius R2 may be centered/originate at the point C and may extend to the housing 248.

The (magnitude of the) radius R3 may, for example, be greater than the (magnitude of the) radius R1. For example, the magnitude of the radius R3 may be 40% greater than the magnitude of the radius R1. Although it is preferred that R3 is 40% greater than R1, R3 may vary within a range of 135%-145% of R1. The radius R3 may be centered/originate at the point B and may extend to the housing 248.

The radius R4 may be centered/originate at the point A and may extend to the housing 248. In particular, the radius R4 may extend to a starting point of the scroll of the housing 248 as shown in FIG. 2C.

The splitter 252 may be located downstream of the starting location of the scroll (where the starting location of the scroll coincides with the location of the arrowhead associated with the radius R4 in FIG. 2C).

The radii R1, R2, and R3 may be tangent to one another.

The profile shown in FIG. 2C and described above is reflective of a particular embodiment that has been determined to be acceptable for use/operation of a deoiler. For example, the profile may be representative of an optimum configuration for a deoiler. The profile described above may vary in terms of one or more of the parameters (or one or more values of the parameters) in some embodiments.

Referring to Table 1 below, an example of a deoiler is provided in terms of air flow that may be entering a bearing compartment. In particular, Table 1 lists the airflow in terms of cubic feet per minute (CFM), cubic meters per minute (CMM), and pounds mass per minute (PMM) for an engine operating condition associated with idle or take-off and with a deoiler impeller speed in revolutions per minute (RPM).

TABLE 1

| | Air Flow Entering Bearing Compartment | | | |
|---|---|---|---|---|
| Engine Condition | Deoiler Impeller Speed (RPM) | Compartment Flow (CFM) | Compartment Flow (CMM) | Compartment Flow (PMM) |
| Idle | 6000 | 3 | 0.09 | 0.23 |
| Take-Off | 12000 | 100 | 2.83 | 7.50 |

For a deoiler with a 3 inch (approximately 76 millimeters) diameter wheel, the deoiler may be capable of pumping more flow at idle than the bearing compartment takes in, such that the deoiler may create a vacuum. For example, in some embodiments the deoiler may pump, e.g., two times, five times, ten times, etc., more air than is leaked into the bearing compartment. The ratio of the pumping of air by the deoiler to the air leaked into the bearing compartment being greater than one may help to ensure that lubricant does not leak out of the bearing compartment. Conversely, during flight (e.g., take-off) the bearing compartment may admit more air flow than is pumped by the deoiler; in such a condition, a reduction may be realized/obtained in twits of a restriction represented by the deoiler. Typically at low power conditions such as idle, the airflow across the engine bearing compartment seals is very low. Idle or low power conditions therefore represent the highest risk of oil leakage out of the bearing compartment. At higher power conditions such as take-off, the airflow across the engine bearing compartment seals is significantly higher and therefore represents very little risk of oil leakage. It is therefore desirable to size the deoiler such that it creates a vacuum at idle conditions to prevent oil leakage, but it is not needed to oversize the deoiler such that it creates a vacuum at all conditions. Since sufficient air is already flowing over the engine bearing compartment seals at higher power conditions, the deoiler may act as an airflow restrictor without risk to compartment oil leakage. Sizing the deoiler in this fashion allows the use of the lightest weight configuration, which may be desirable for, e.g., aircraft applications.

To illustrate the foregoing, Table 2 below provides an example in terms of flow overcapacity/pumping and restriction as described above. Table 2 is shown with respect to idle and take-off conditions (similar to Table 1 above) and assumes an impellor that is 50% efficient (conventional impellers may be approximately 70% efficient; the addition of a splitter to the deoiler may cause an additional flow loss/reduction). An exit area (also referred to as a blast area) of the deoiler may be approximately equal to 0.9 square inches (approximately 0.00625 square feet). The flow may be equal to the product of: (1) the wheel speed (illustratively measured at the tips of the impeller in terms of, e.g., feet per minute [FPM]), (2) the blast area, and (3) the efficiency.

TABLE 2

| | Flow Overcapacity States | | | |
|---|---|---|---|---|
| Engine Condition | Deoiler Impeller Speed (RPM) | 100% Tip Speed of Impeller (FPM) | Flow at 50% Efficiency (CFM) | Flow Overcapacity |
| Idle | 6000 | 4712 | 15 | 5 |
| Take-Off | 12000 | 9424 | 30 | — |

In comparing Table 2 to Table 1, at the idle engine condition the flow output by the deoiler is approximately 15 CFM, whereas the flow into the bearing compartment is approximately 3 CFM; hence, a flow overcapacity of 15/3=5 is realized. In contrast, during take-off the flow output by the deoiler is approximately 30 CFM, whereas the flow into the bearing compartment is approximately 100 CFM; hence, the deoiler represents a restriction (e.g., 30 is less than 100).

Aspects of the disclosure are directed to systems, apparatuses, and methods that may be used to separate a lubricant from air in conjunction with an engine. In some embodiments, the separation may be obtained via hardware that includes relatively few components (e.g., a count/number of components that is less than a threshold). Hardware that incorporates aspects of this disclosure may be more reliable in terms of operability/functionality, cheaper to fabricate/manufacture, and lighter in terms of weight relative to legacy/existing hardware.

Aspects of the disclosure may ensure that one or more seals of an engine are operable. Aspects of the disclosure may reduce (e.g., minimize) seal leakage and reduce an emission of fumes from the engine.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A gas turbine engine comprising:
   a shaft;
   a bearing compartment that includes a bearing that supports the shaft;
   a gearbox that is driven by the shaft;
   a deoiler that is driven by the gearbox; and
   a lubrication system that includes a pump and a tank,
   wherein the deoiler includes
      an impeller;
      a first port that receives a mixture of lubricant and air from the bearing compartment, the first port extending axially with respect to a center of rotation of the impeller;
      a housing disposed about the impeller and arranged as a volute scroll, the housing including a tapered inner surface defining a portion of a fluid channel;
      a splitter wall located at an exit of the deoiler defined by the housing that separates the lubricant and air discharged by the deoiler;
      a second port that discharges the lubricant to at least one of the pump, the tank, or the gearbox, the second port extending tangentially from the exit with respect to the center of rotation; and
      a third port that discharges the air from the deoiler;
   wherein the first port is disposed at a center of the impeller.

2. The gas turbine engine of claim 1, wherein the lubricant includes oil.

3. The gas turbine engine of claim 1, wherein the third port discharges the air to an overboard location that is external to the engine.

4. The gas turbine engine of claim 1, further comprising:
   a duct that conveys the mixture of lubricant and air from the bearing compartment to the first port.

5. The gas turbine engine of claim 1, wherein the impeller includes a wheel and a plurality of vanes that project from the wheel, and wherein a rotation of the wheel causes the mixture of lubricant and air to separate in the deoiler.

6. The gas turbine engine of claim 1, wherein the tapered inner surface includes a first surface and a second surface, the first surface and the second surface defining a v-shaped profile and wherein the tapered inner surface defines a radially outermost boundary of the fluid channel.

7. The gas turbine engine of claim 1, wherein the deoiler is defined by at least a first radius, a second radius, a third radius, and a fourth radius,
  wherein the first radius is a radius of the impeller and originates at a first point of the impeller corresponding to the center of rotation of the impeller,
  wherein a magnitude of the second radius is equal to a value that is within a range of 95% to 105% of a magnitude of the first radius, where the second radius originates at a second point that is laterally offset from the first point in a first direction by an amount equal to a value that is within a range of 8% to 12% of the magnitude of the first radius, and where the second radius extends to the housing,
  wherein a magnitude of the third radius is equal to a value that is within a range of 115% to 125% of the magnitude of the second radius, where the third radius originates at a third point that is laterally offset from the first point in a second direction by an amount equal to a value that is within a range of 8% to 12% of the magnitude of the first radius, where the third radius extends to the housing, and where the second direction is opposite the first direction,
  wherein a magnitude of the fourth radius is equal to a value that is within a range of 135% to 145% of the magnitude of the second radius, where the fourth radius originates at the second point, and where the fourth radius extends to the housing, and
  wherein the second radius, the third radius, and the fourth radius are tangent to one another.

8. The gas turbine engine of claim 7, wherein the deoiler is defined by a fifth radius that originates at the first point and extends to a starting point of the volute scroll, and wherein the splitter wall is located downstream of the starting point of the volute scroll.

9. The gas turbine engine of claim 1, wherein the bearing compartment includes at least one seal.

10. The gas turbine engine of claim 9, wherein during an idle operating condition of the engine the deoiler pumps at least two times more air than is leaked into the bearing compartment via the at least one seal.

11. The gas turbine engine of claim 10, wherein during the idle operating condition of the engine the deoiler pumps at least five times more air than is leaked into the bearing compartment via the at least one seal.

12. The gas turbine engine of claim 11, wherein during the idle operating condition of the engine the deoiler pumps at least ten times more air than is leaked into the bearing compartment via the at least one seal.

13. The gas turbine engine of claim 9, wherein the engine is included on an aircraft, and wherein during a take-off operating condition the deoiler pumps less air than is leaked into the bearing compartment via the at least one seal.

* * * * *